United States Patent [19]

Bowder

[11] Patent Number: 4,821,954

[45] Date of Patent: Apr. 18, 1989

[54] THERMALLY ACTIVATED SNAP-ACTION VALVE

[75] Inventor: Thomas H. Bowder, Coventry, R.I.

[73] Assignee: Elmwood Sensors, Inc., Pawtucket, R.I.

[21] Appl. No.: 200,046

[22] Filed: May 31, 1988

[51] Int. Cl.$^4$ ............................................. G05D 23/10
[52] U.S. Cl. ................................ 236/48 R; 236/93 R; 251/357; 251/359
[58] Field of Search ................ 236/48 R, 93 R, 101 E; 251/75, 337, 359; 137/539

[56] References Cited

U.S. PATENT DOCUMENTS

| | | | |
|---|---|---|---|
| 2,451,586 | 10/1948 | Strid | 137/539 X |
| 2,533,600 | 12/1950 | Matteson | 236/93 R X |
| 3,302,662 | 2/1967 | Webb | 137/539 |
| 3,903,923 | 9/1975 | Loup et al. | 137/540 X |
| 4,311,272 | 1/1982 | Foller | 236/48 R X |
| 4,471,906 | 9/1984 | Noguchi et al. | 236/93 R X |
| 4,674,540 | 6/1987 | Takei et al. | 251/337 X |
| 4,723,704 | 2/1988 | Muramoto | 251/337 X |

Primary Examiner—William E. Tapolcai
Attorney, Agent, or Firm—Salter & Michaelson

[57] ABSTRACT

A thermally activated snap-action valve includes a valve body having an interior cavity and inlet and outlet passages formed therein and a bimetallic disc, a ball element, and a resilient positioning plate in the cavity. The positioning plate is operative for normally positioning the ball element in inwardly spaced relation to a valve seat at the inner end of the outlet passage, and the bimetallic disc is mounted in the cavity so that the pressures in a fluid passing through the valve are substantially equal on opposite sides of the bimetallic disc. The bimetallic disc is operative with a flexing action in response to a predetermined temperature condition for moving the ball element to a closed position wherein it is received in the valve seat to obstruct the outward flow of fluid through the outlet passage.

7 Claims, 2 Drawing Sheets

THERMALLY ACTIVATED SNAP-ACTION VALVE

BACKGROUND AND SUMMARY OF THE INVENTION

The instant invention relates to thermally activated valves and more particularly to a valve which is operative with a snap-action action in response to a predetermined temperature condition for controlling a fluid flow.

A variety of different types of thermally activated valves have been heretofore available for use in various specific applications. For example, thermally activated valves have been heretofore available for use in automatic automotive transmissions in order to prevent the flow of transmission fluids under certain operating conditions. Specifically, they have been utilized for preventing the flow of transmission fluids through the torque converter sections of automatic transmission before suitable fluid operating temperature levels are reached. In this connection, however, it has been found that for applications of this general type, in order to avoid equipment damage, thermally activated valves must be highly reliable, and they must be highly sensitive to fluid temperature changes, although they must be relatively insensitive to fluid pressure changes.

Thermally activated devices representing the closest prior art to the subject invention of which the applicant is aware are disclosed in the U.S. Pat. Nos. to Ludwig, Re.30,552; Zinkle, 2,271,850; Frumet, Jr., 2,742,927; O'Hara et al, 3,411,712; Meulendyk et al, 3,587,967; Soberski, 3,612,018; Myers, 3,687,290; McIntire, 3,804,326; Schneider, 3,853,268; Doherty, Jr., 3,856,259; Place, 3,930,613 and Bible, 3,963,042. However, since these references fail to teach a thermally activated snap-action valve which is operative with a high level of sensitivity and reliability in the manner of the snap-action valve of the instant invention, they are believed to be of only general interest with respect thereto.

The instant invention provides a reliable thermally activated snap-action valve which is highly sensitive to fluid temperature changes but relatively insensitive to fluid pressure changes, and which therefore can be effectively utilized for applications such as in automatic transmissions. Specifically, the thermally activated snap-action valve of the instant invention comprises a valve body having an interior cavity formed therein and inlet and outlet passages which communicate with the cavity, a valve seat adjacent the inner end of the outlet passage, and a ball element in the cavity which is receivable in a closed position in the valve seat for obstructing the flow of fluid therethrough. The valve further comprises a resilient positioning plate which is operative for positioning the ball element so that it is normally disposed in an open position wherein it is spaced inwardly from the valve seat, but so that it is resiliently movable to a closed position wherein it obstructs the valve seat. The thermally activated valve of the instant invention further comprises a bimetallic disc in the cavity which is operative with a snap action in response to a predetermined temperature condition and communicates with the ball element for moving the ball element from the open position thereof to the closed position thereof in response to the predetermined temperature condition. The bimetallic disc is preferably mounted on a shoulder which is formed in the valve body in the cavity, and the valve body is preferably formed so that it has a plurality of fluid passages therein which are spaced around the perimeter of the bimetallic disc for allowing a fluid to pass through the cavity from the inlet passage to the outlet passage. As a result, the fluid pressures on the opposite sides of the bimetallic disc are always maintained at substantially equal levels so that the effects of fluid pressures on the bimetallic disc are minimal. The resilient spring plate (also not effected by fluid pressure) which is operative for positioning the ball element in the cavity is preferably integrally blanked from a resilient sheet metal, and it comprises a central portion having a central aperture therein, and a plurality of resilient arms which extend outwardly from the central portion. The ball element is received and supported in the central aperture in the spring plate, and the resilient arms are preferably supported by a second shoulder which is formed in the valve body adjacent the valve seat. Further, a reduced cavity section is preferably formed in the valve body adjacent the inner end of the outlet passage, and the valve seat is preferably defined by a valve seat member which is received in the reduced cavity section so that fluid passing through the cavity must pass through the valve seat member prior to passing outwardly through the outlet passage. The snap-action valve preferably further comprises a resilient spring washer which is received in the reduced cavity section adjacent the inner end of the outlet passage for cushioning the valve seat member so that the valve seat member is slightly resiliently deflectable in response to a force applied thereto by the bimetallic disc through the ball element when the ball element is in the closed position.

During use and operation of the snap-action valve of the instant invention, a fluid passing through the cavity in the valve body is maintained in intimate contact with the bimetallic disc so that the temperature of the bimetallic disc is always maintained at essentially the same level as the temperature of the fluid, and as a result, the snap-action valve of the instant invention is extremely sensitive to temperature changes. Further, since the valve is constructed so that the fluid pressures on the opposite sides of the bimetallic disc (and the resilient spring plate) are always maintained at essentially equal levels, the valve is relatively insensitive to fluid pressure changes. Still further, since the snap-action valve of the instant invention is operative with a positive switching action utilizing a minimum of moving parts, it is highly reliable, and it can be effectively utilized in a variety of applications.

Accordingly, it is a primary object of the instant invention to provide an effective and reliable thermally activated snap-action valve.

Another object of the instant invention is to provide an effective snap-action valve which is highly sensitive to fluid temperature changes.

An even further object of the instant invention is to provide an effective snap-action valve which is essentially uneffected by fluid pressure changes.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE INVENTION

Figure 1:
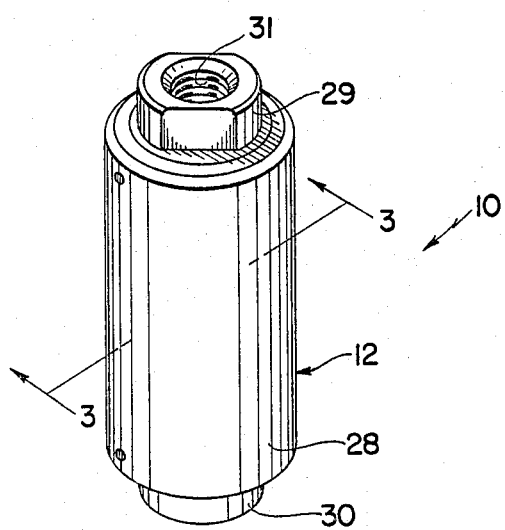
FIG. 1 is a perspective view of the thermally activated snap-action valve of the instant invention.
Figure 2:
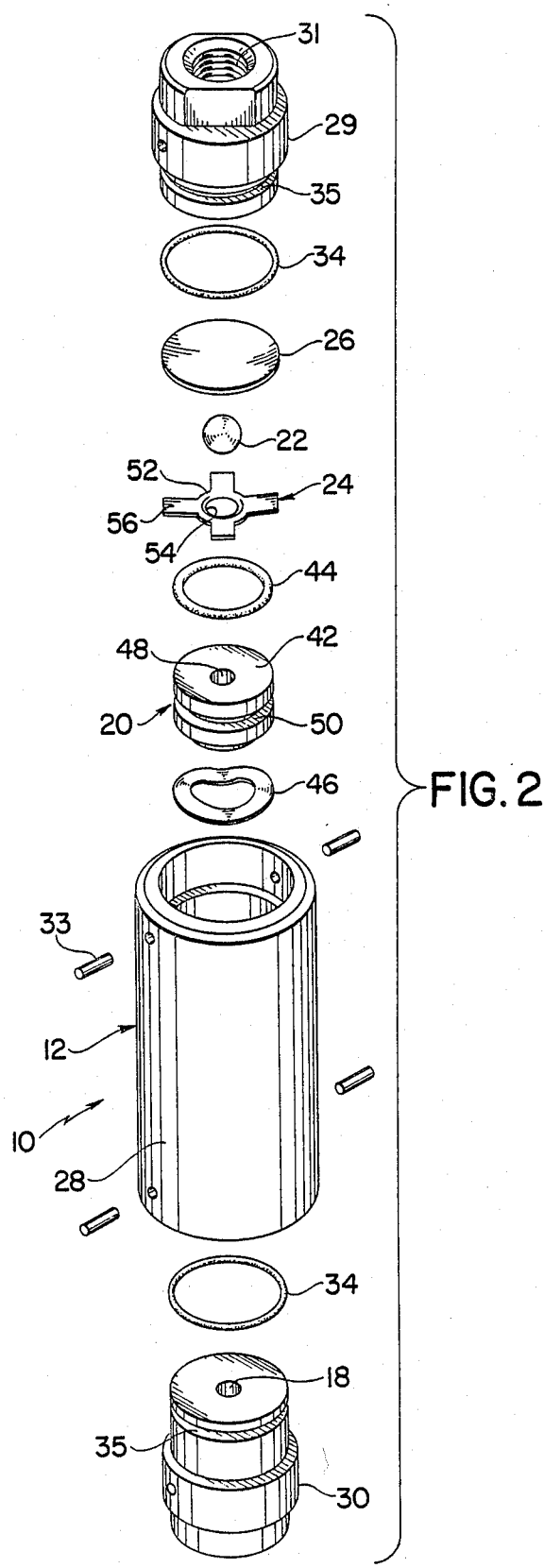
FIG. 2 is an exploded perspective view thereof.

Referring now to the drawing, the thermally activated snap-action valve of the instant invention is illustrated and generally indicated at 10 in FIGS. 1-4. The valve 10 comprises a valve body generally indicated at 12 having an interior cavity 14 and inlet and outlet passages 16 and 18, respectively, formed therein, a valve seat assembly generally indicated at 20, a ball element 22, a ball element positioning plate generally indicated at 24, and a bimetallic disc 26. In assembled relation, the seal assembly 20 is received in the cavity 14 adjacent the inner end of the outlet passage 18, and the positioning plate 24 is operative for positioning the ball element 22 in the cavity 14 adjacent the seat assembly 20 so that it is movable between the open and closed positions illustrated in FIGS. 4 and 3, respectively. The bimetallic dics 26 is mounted in the cavity 14 so that it communicates with the ball element 22 for moving the ball element 22 to the closed position illustrated in FIG. 3 in response to a predetermined temperature condition.

The valve body 12 comprises a tubular main body section 28 and upper and lower plug-like fittings 29 and 30, respectively, which are received in the upper and lower ends of the main body section 28, respectively, and cooperate with the main body section 28 to define the interior cavity 14. The main body section 28 and the upper and lower plug-like fittings 29 and 30, respectively, are preferably made of a suitable durable metal, such as aluminum or brass. Further, the upper and lower fittings 29 and 30, respectively, have threaded sockets 31 and 32, respectively, formed therein, and the inlet and outlet passages 16 and 18, respectively, extend inwardly from the thread sockets 31 and 32, respectively. The upper and lower fittings 29 and 30, respectively, are secured to the main body section 28 with pins 33, and O-rings 34 are received in annular grooves 35 in the upper and lower fittings 29 and 30, respectively, for sealing between the fittings 29 and 30 and the main body section 28. The main body section 28 has a first interior shoulder 36 formed therein which is dimensioned for receiving and positioning the bimetallic disc 26 in the cavity 14, and a plurality of spaced passages 37 are formed around the perimeter of the shoulder 36 for allowing a fluid to pass freely from one side of the bimetallic disc 26 to the opposite side thereof in the cavity 14. Further, the upper fitting 29 is preferably secured in the upper end of the main body section 28 with the pins 33 so that the fitting 29 positions the disc 26 to achieve optimum flexing action thereof in the cavity 14. A second interior shoulder 38 is formed in the lower portion of the main body section 28 so that it is disposed between the shoulder 36 and the valve seat assembly 20, the shoulder 38 being adapted and dimensioned for receiving and positioning the positioning plate 24 in the lower portion of the main body section 28. Also formed in the lower portion of the main body section 28 is a substantially circular reduced cavity section 40 which is located adjacent the inner end of the outlet passage 18 and adapted for receiving and positioning the seat assembly 20 in the valve 10.

The valve seat assembly 20 comprises a seat member 42, an O-ring 44 and a resilient wavy washer 46. The seat member 42 is preferably made from a suitable durable plastic material, such as nylon, and it has a tubular passage 48 therethrough, and an annular groove 50 is also formed in the seat member 42. The O-ring 44 is assembled in the annular groove 50 for providing a seal between the seat member 42 and the main body section 28 in the reduced cavity section 40. The wavy washer 46 is received in the reduced cavity section 40 for supporting the seat member 42 therein, and the seat member 42 is received in the reduced cavity section 40 so that the passage 48 is substantially aligned with the outlet passage 18. When the valve seat assembly 20 is assembled in the valve body 12 in this manner, the inner end of the passage 48 provides a seat for receiving the ball element 22 in order to obstruct the outward flow of a fluid through the the outlet passage 18.

The ball element 22 preferably comprises a spherical metal ball which is dimensioned to be received in the inner end of the passage 48 in the seat member 42 in order to obstruct the flow of a fluid therethrough.

The positioning plate 24 is preferably integrally blanked from a suitable resilient sheet metal, and it includes a central portion 52 having a central aperture 54 therein and a plurality of arms 56 which extend outwardly from the central portion 52. The positioning plate 24 is received in the cavity 14 so that the outer ends of the arms 56 are supported on the shoulder 38, and it is adapted and dimensioned for receiving and supporting the ball element 22 in the aperture 54 in a manner which nevertheless permits the ball element 22 to be received in the seat defined by the inner end of the passage 48. More specifically, the positioning plate 24 is adapted for receiving the ball element 22 so that a significant portion thereof projects through the aperture 54 but for nevertheless normally maintaining the ball element 22 in inwardly spaced relation to the seat defined by the inner end of the passage 48 as illustrated in FIG. 4. The positioning plate 24 is, however, constructed so that the arms 56 are resiliently deflectable to enable the ball element 22 to be received in the seat defined by the inner end of the passage 48 as illustrated in FIG. 3.

Figure 3:
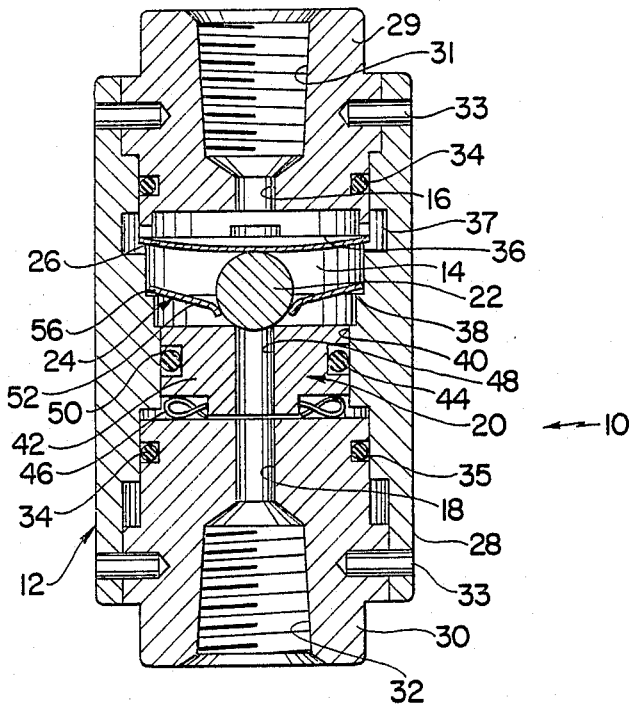
FIG. 3 is a sectional view taken along line 3≧3 in FIG. 1 with the valve in the closed position.
Figure 4:
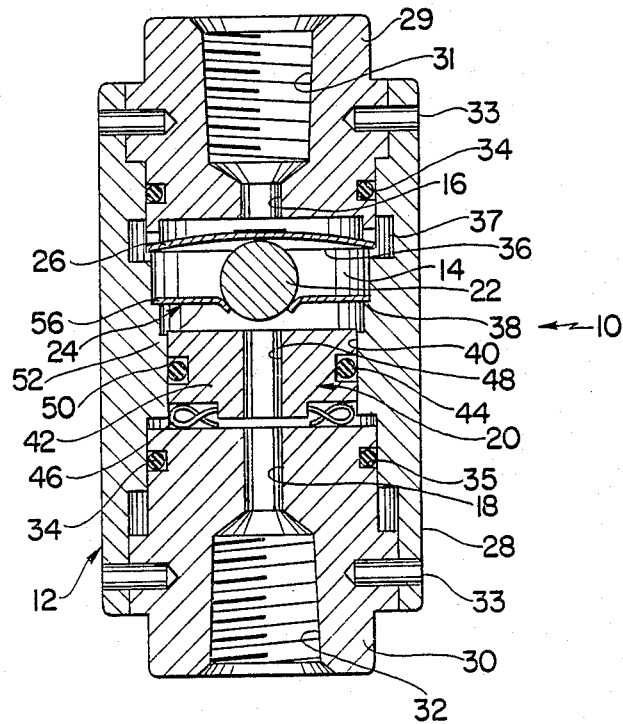
FIG. 4 is a similar sectional view with the valve in the open position.

The bimetallic disc 26 comprises a conventional bimetallic disc, and it is operative with a snap action for flexing between the position illustrated in FIG. 3 and the position illustrated in FIG. 4 in response to a predetermined temperature condition. The bimetallic disc 26 is received in the cavity 14 so that it is supported on the shoulder 36 and so that it engages the ball element 22 for moving the ball element 22 from the open position illustrated in FIG. 4 to the closed position illustrated in FIG. 3 in response to flexing action of the bimetallic disc 26 as caused by the predetermined temperature condition.

Accordingly, during use and operation of the valve 10, the bimetallic disc 26 is operative for flexing in response to a predetermined temperature condition in order to move the ball element 22 from the open position illustrated in FIG. 4 to the closed position illustrated in FIG. 3, and the bimetallic disc 26 is adapted so that it returns to the original or unflexed position thereof illustrated in FIG. 4 in response to a second predetermined temperature condition. The positioning plate 24 is resiliently deflectable in response to flexing movement of the bimetallic disc 26 to allow the ball element 22 to be seated in the valve seat defined by the inner end of the passage 48, and the positioning plate 24 is operative for returning the ball element 22 to the open position thereof illustrated in FIG. 4 wherein the ball element 22 is positioned in inwardly spaced relation to the inner end of the passage 48 when the bimetallic disc returns to the original or unflexed position thereof. Further, when the ball element 22 is moved to the closed position thereof illustrated in FIG. 3, the seat member 42 is movable slightly against the force of the wavy washer 46 in order to compensate for thermal overtravel of the bimetallic disc 26. In any event, since a fluid passing through the valve 10 is always maintained in intimate contact with both sides of the bimetallic disc 26, the bimetallic disc 26 is highly responsive to fluid temperature changes. However, since a fluid passing through the valve 10 can pass freely through the fluid passages 37, the pressures on the opposite sides of the bimetallic disc 26 are always substantially equal, and the operation of the bimetallic disc 26 is essentially unaffected by fluid pressures. Further, since the pressures on the various portions of the positioning plate 24 are virtually equal, the operation of the positioning plate 24 is also essentially unaffected by fluid pressures, and accordingly, the overall operation of the internal components of the valve 10 is essentially unaffected by the pressure in a fluid passing through the valve 10.

It is seen therefore the instant invention provides a highly effective thermally activated snap-action valve. Specifically, the valve 10 is operative with a minimum of moving parts so that it can be reliably utilized for arresting the flow of a fluid in response to a predetermined temperature condition. Further, the valve 10 is highly responsive to fluid temperature changes, but it is virtually uneffected by fluid pressure changes. Hence, the valve 10 can be reliably utilized in a variety of applications, and it respresents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A thermally activated snap-action valve comprising a valve body having an interior cavity therein and inlet and outlet passages which communicate with said cavity, a valve seat adjacent the inner end of said outlet passage, a ball element in said cavity positionable in a closed position wherein it is received in said valve seat for obstructing the flow of a fluid through said valve seat and outwardly through said outlet passage, resilient positioning means in said cavity positioning said ball element so that it is normally disposed in an open position wherein it is spaced inwardly from said valve seat but so that it is resilient movable to said closed position, and a bimetallic disc operative with a snap action in response to a predetermined temperature condition, said valve body having a disc shoulder formed therein, said bimetallic disc being received on said shoulder and communicating with said ball element for moving same from the open position thereof to the closed position thereof in response to said temperature condition, said valve body also having a plurality of fluid passages formed therein at spaced location around the perimeter of said disc, fluid passing through said fluid passages as it passes through said cavity from said inlet passage to said outlet passage, said fluid passages cooperating to maintain the fluid pressures on opposite sides of said disc substantially equal.

2. In the snap-action valve of claim 1, said resilient positioning means comprising a resilient spring plate including a central portion having a central aperture therein and a plurality of resilient arms which extend outwardly from said central portion, said ball element being received and supported in said central aperture, and means supporting said resilient arms for normally maintaining said ball element in said open position, said resilient arms being resiliently deflectable to enable said ball element to be moved to said closed position thereof.

3. In the snap-action valve of claim 2, said resilient spring plate being integrally blanked from a resilient sheet metal.

4. In the snap-action valve of claim 1, said valve body having a reduced cavity section formed therein adjacent the inner end of said outlet passage, said valve set being defined by a valve seat member, said valve seat member being received in said reduced cavity section, fluid from passing through said valve passing through said seat member prior to passing outwardly through said outlet passage.

5. The snap-action valve of claim 4 further comprising means resiliently supporting said valve seat member in said reduced cavity section so that said valve seat member is resiliently deflectable slightly in response to a force applied thereto by bimetallic means through said ball element when said ball element is in the closed position thereof.

6. In the snap-action valve of claim 2, said resilient spring plate being mounted in said cavity so that the fluid pressures on opposite sides thereof are substantially equal.

7. A thermally activated snap-action valve comprising a valve body having an interior cavity therein and inlet and outlet passages which communicate with said cavity, a valve seat adjacent the inner end of said outlet passage, a ball element in said cavity positionable in a closed position wherein it is received in said valve seat for obstructing the flow of a fluid through said valve seat and outwardly through said outlet passage, resilient positioning means in said cavity positioning said ball element so that it is normally disposed in an open position wherein it is spaced inwardly from said valve seat but so that it is resiliently movable to said closed position, bimetallic means in said cavity operative with a snap action in response to a predetermined temperature condition and communicating with said ball element for moving same from the open position thereof to the closed position thereof in response to said temperature condition, said valve body having a reduced cavity section formed therein adjacent the inner end of said outlet passage, said valve seat being defined by a valve seat member, said valve seat member being received in said reduced cavity section, fluid passing through said valve passing through said valve seat member prior to passing outwardly through said outlet pasasge, and means resiliently supporting said valve seat member in said reduced cavity section so that said valve seat member is resiliently deflectable slightly in response to a force applied thereto by bimetallic means through said ball element when said ball element is in the closed position thereof.

* * * * *